United States Patent [19]

Chapman et al.

[11] Patent Number: 4,946,739

[45] Date of Patent: Aug. 7, 1990

[54] ENAMEL RECEPTIVE BANNER FABRIC

[75] Inventors: Dwight E. Chapman, Columbus, Ohio; David R. Morse, Sandown, N.H.

[73] Assignee: Borden, Inc., Columbus, Ohio

[21] Appl. No.: 283,717

[22] Filed: Dec. 13, 1988

[51] Int. Cl.$^5$ ............................................. B32B 27/30
[52] U.S. Cl. .................................... 428/286; 40/615; 422/252; 422/253; 422/254; 422/265; 422/267; 422/268; 422/284; 422/290
[58] Field of Search .............. 428/284, 285, 286, 287, 428/251, 252, 253, 334, 335, 336, 520, 265, 267, 268, 290, 254; 40/615

[56] References Cited

U.S. PATENT DOCUMENTS

| | | | |
|---|---|---|---|
| 2,404,313 | 7/1946 | Rodman | 117/161 |
| 2,439,051 | 4/1948 | McGill | 428/286 |
| 2,705,690 | 4/1955 | Nelson et al. | 428/286 |
| 2,823,156 | 2/1958 | Hedges | 428/253 |
| 2,929,737 | 3/1960 | Tischbein | 117/76 |
| 3,075,863 | 1/1963 | Frey | 428/252 |
| 3,249,463 | 5/1966 | Carlee | 428/286 |
| 3,988,519 | 10/1976 | Stoller | 428/15 |
| 4,110,497 | 8/1978 | Hoel | 428/190 |
| 4,284,681 | 8/1981 | Tidmarsh et al. | 428/246 |
| 4,443,516 | 4/1984 | Rogers | 428/253 |
| 4,452,850 | 6/1984 | Even et al. | 428/252 |
| 4,454,191 | 6/1984 | von Blücher et al. | 428/286 |
| 4,510,201 | 4/1985 | Takeuchi et al. | 428/286 |
| 4,556,589 | 12/1985 | Neumann et al. | 428/286 |
| 4,746,565 | 5/1988 | Bafford et al. | 428/285 |

OTHER PUBLICATIONS

The Herculite Publication "Tips for Decorating BANTEX +Plus+".
The Cooper-Cameron Incorporated News Release Publication.
The Custom Chemicals Company *Aqualour Bulletin*.
The Custom Chemicals Company *Mixing and Handling of CIE-27*.

*Primary Examiner*—James J. Bell
*Attorney, Agent, or Firm*—Venable, Baetjer & Howard

[57] ABSTRACT

This invention is directed to an enamel paint receptive flexible laminate and its method of manufacture. The laminate is useful for making banners, flags, signs and the like that are decorated with enamel poster paints. The laminates of the present invention comprise a base fabric material, a first film coating of a plasticized polyvinyl chloride and a second coating of thermosetting vinyl acrylic copolymer. The thermosetting vinyl acrylic copolymer promotes increased adhesion and decreased drying time of poster paints and lettering enamel when they are applied to the coating.

9 Claims, No Drawings

4,946,739

ENAMEL RECEPTIVE BANNER FABRIC

FIELD OF THE INVENTION

This invention is directed to an enamel paint receptive laminate useful for making banners, flags, signs and the like that are decorated with poster paints or lettering enamels. Specifically, this invention is directed to a fabric coated with at least two films. First, a plasticized polyvinyl chloride film is disposed over the fabric. Second, a thermosetting vinyl acrylic copolymer coating is disposed over the plasticized polyvinyl chloride film. The thermosetting vinyl acrylic copolymer promotes increased adhesion and decreased drying time of poster paints and lettering enamels when they are applied to the coating.

BACKGROUND OF THE INVENTION

Plasticized polyvinyl chloride (PVC) films laminated to various substrates are used for banners, flags, signs and the like. These laminated substrates are painted with poster paints or various types of lettering enamels. However, banner and sign painters are faced with two problems. One, drying time of lettering enamels is too long. Two, the adhesion of lettering enamels to available laminated banner substrates is poor.

One current solution to these problems is to apply a primer to the vinyl banner prior to painting with the enamel paint. This process takes up valuable space, increases expenses and greatly slows down productivity. Furthermore, priming processes are not always effective with all paints and all vinyl banner fabrics.

Another current solution to the adhesion problem is to wash the PVC coated banner fabric with a solvent prior to painting with the lettering enamel. Like priming, however, this step increases expense and greatly slows down productivity. Additionally, drying time is not improved by solvent washing.

Another current solution to the problems of poor drying time and adhesion is to apply a special coating on the plasticized PVC film. Several coatings have been tested including a solvent based vinyl/acrylic coating and an acrylic latex coating which show improved drying time, however adhesion has remained relatively poor. Consequently, painted banners of these types experience flaking and cracking of the enamel paint lettering and design. Additionally, a solvent based polyurethane coating showed good adhesion and improved drying time, however, banner manufacturers complained that drying time was still too long.

Although many enamel receptive banner fabrics are available, no single banner material completely satisfies the drying time requirements and the adhesion requirements without some form of priming or solvent washing.

This invention provides a laminated substrate for use in the production of banners, flags, signs and the like comprised of a fabric base layer, a plasticized PVC film layer and a vinyl acrylic copolymer coating outer layer. The vinyl acrylic copolymer layer provides a surface wherein the enamel paints exhibit satisfying adhesion and reduced drying time as compared to conventional banner substrates once applied to the surface.

SUMMARY OF THE INVENTION

This invention provides an enamel paint receptive laminate useful for making signs and banners comprising a fabric sandwiched between two layers of a plasticized polyvinyl chloride wherein at least one layer of the plasticized polyvinyl chloride is coated with an enamel receptive vinyl acrylic copolymer. Enamel lettering and decoration paint when applied to the laminate show improved drying time and adhesion over conventional laminated substrates.

Also provided by this invention are banners, flags, and signs with enamel paint lettering and decoration that exhibit improved adhesion to the substrate. The banners, flags, signs and the like provided by this invention comprise at least four layers including a fabric base layer, a plasticized polyvinyl chloride film layer, a vinyl acrylic copolymer coating and an enamel paint lettering or decoration.

Further provided by this invention is a method of manufacturing banners, flags, signs and the like wherein a quality product is produced in less time than conventional methods without priming or solvent washing.

DETAILED DESCRIPTION OF THE INVENTION

The banners, flags, signs and the like, hereinafter referred to as banners or banner substrates, included in the present invention exhibit improvements over conventional banner substrates and banner manufacture. One, banners of the present invention exhibit improved adhesion between enamel paint lettering or decoration and the outer vinyl acrylic copolymer surface of the banner substrate. Two, the banner substrate enables paint to dry faster than it was previously able to dry on conventional banner substrates.

The banner substrate of the present invention preferably comprises at least three layers. These layers include a base fabric material, a plasticized polyvinyl chloride film disposed over at least one surface of the core fabric material, and a vinyl acrylic copolymer coating disposed over at least one of the polyvinyl chloride films. In other embodiments of the invention, the banner substrate may include two or more consecutive coatings of plasticized polyvinyl chloride film under the vinyl acrylic copolymer coating.

The base fabric material is a flexible sheet of base fabric also referred to herein as core fabric.

The base fabric may be nonwoven, woven or knit. Preferably, the base fabric is woven or knit which provides tensile strength and tear resistance.

Additionally, the base fabric may be natural or synthetic. Examples of natural materials suitable for the core fabric include cotton and wool. The present invention may also employ cellulosic materials such as paper as a core fabric. Preferably, however, the core fabric is a synthetic material. Synthetic materials such as polyesters, nylon and fiberglass exhibit high tensile strength and tear resistance. Furthermore, synthetic materials are resistant to the effects of age, sun, weather, moths and mildew.

The more preferred synthetic material useful for this invention because of its high strength, tear resistance and availability is a polyester material. One such polyester material suitable for the invention is a weft insertion WARP knit polyester fabric.

The base fabric material provides strength for the plasticized polyvinyl chloride film.

The plasticized polyvinyl chloride film may be applied to one or both faces of the core fabric. Preferably, the polyvinyl chloride film has a thickness between 1 mil and 30 mils. Most preferably, the polyvinyl chloride film has a thickness between 3 mils and 6 mils. Thickness within these ranges provide strength and flexibility.

The vinyl acrylic copolymer coating is disposed over the exposed face of the polyvinyl chloride film. If only one face of the core fabric is covered with plasticized polyvinyl chloride film, that film is coated with the vinyl acrylic copolymer. If both faces of the core fabric are covered with the plasticized polyvinyl chloride film, then one or both of the plasticized polyvinyl chloride films could be coated with the vinyl acrylic copolymer. The vinyl acrylic copolymer coating is preferably 0.25 mils thick when dry; however, thicknesses of 0.1 to 1 mil are acceptable. Thickness within this range provides excellent flexibility without cracking.

The vinyl acrylic coating is preferably dried from a water based dispersion of a poly (vinyl chloride-vinyl acetate) copolymer/acrylic polymer or acrylic copolymer, then cured. Specifically, the coating may be obtained by applying heat to CIE-27, a water based vinyl acrylic dispersion available through Custom Chemicals Company of Elmwood Park, N. J. CIE-27 is a dispersion containing 13.0 weight percent of a vinyl acrylic copolymer, 33.0 weight percent synthetic silica, 44.0 weight percent water and 7.0 weight percent isopropyl alcohol. The dispersion has the following properties as reported by the manufacturer:

Density 9.09 lb/gal (±5%)
pH 3–4
Solids Content 46% (±5%)
Viscosity 2000 cps (±15%)

Typically, CIE-27 is used as an extender for organic and inorganic pigments.

In the present invention, CIE-27 is disposed over the plasticized polyvinyl chloride film and exposed to temperatures above about 230° F. to cure the vinyl acrylic copolymer.

The vinyl acrylic copolymer provides a barrier layer that prevents migration of plasticizer toward freshly applied paint which is believed to improve the adhesion of paint. The vinyl acrylic copolymer provides a high surface area for evaporation which reduces drying time. The preferred vinyl acrylic copolymer contains fillers such as amorphous synthetic silica particles which provide a high surface area for the evaporation of water and volatile organics.

The paints contemplated by the present invention are relatively opaque coatings applied typically with a brush or as a spray as thin layers upon the vinyl acrylic copolymer layer. Paints, historically and used herein, are a dispersion of a finely divided pigment in a liquid composed of a resin binder and a solvent. The paints include any of the known paints. However, the most preferred paint is an alkyd based paint exhibiting high luster. One class of these type paints is typically known as poster and bulletin enamels or enamel sign paints. Examples of such paints include Fine Painters 1-Shot Lettering Enamel 104-L available through Consumers Paint Factory, Inc. of Gary, Ind. and Lettering Enamel #L162 Purple manufactured by Chromatic Paint Corporation of Garnerville, N. Y. Other paints of this class are considered equally acceptable.

Manufacture of the banner substrate may be accomplished by the following method. First, a vinyl acrylic dispersion is coated over a plasticized polyvinyl chloride film. Then, the vinyl acrylic dispersion is heated at a temperature below about 220° F. to remove water from the dispersion and to form a vinyl acrylic coating adhered to the plasticized polyvinyl chloride layer.

The plasticized polyvinyl chloride film side of the vinyl acrylic-plasticized polyvinyl chloride laminate formed above is then adhesively laminated with a vinyl plastisol adhesive to the core fabric at a temperature above 230° F. Temperatures above about 230° F. set both the vinyl plastisol adhesive and the vinyl acrylic copolymer film.

During the adhesive laminating process, several layers of plasticized polyvinyl chloride may be included. For example, a plasticized polyvinyl chloride film may be adhesively bonded to the surface of the core fabric opposed to the surface the vinyl acrylic-plasticized polyvinyl chloride laminate is adhered to. Additionally, several films of plasticized polyvinyl chloride may be adhesively bonded between the plasticized polyvinyl chloride film side of the vinyl acrylic-plasticized polyvinyl chloride laminate and the core fabric.

An alternative method of manufacture includes drying and curing the vinyl acrylic copolymer on the plasticized polyvinyl chloride film before laminating to the base fabric.

The above methods of manufacture are considered as illustrative only of embodiments of the invention. Since numerous modifications and changes will readily occur to those skilled in the art, it is not desired to limit the invention to the exact constructions and methods described, and accordingly, equivalents which may be resorted to, fall within the scope of the invention.

The advantages of the invention and its preferred embodiment are more fully illustrated in the example that follows. The example illustrates a particular embodiment of the invention. It is emphasized that not all embodiments of this invention are illustrated with the particularity given below.

EXAMPLE 1 and Comparative Examples

The following example and comparative examples show the improvement on conventional banner substrates and the improvement in making the banners. The improvement in the banner itself relates to the improved adhesion of enamel lettering paints to the banner substrate. The improvement in making the banner relates to a decrease in required drying time needed for paint to dry on the banner substrate. The base fabric and lettering enamel utilized were the same throughout each example and comparative example. Each sample was air dried at 68° F. Tape tests were performed using Permacel ® masking tape manufactured by Avery International Co. of New Brunswick, N. J. and Scotch Magic ® Tape #810 manufactured by 3M Corp. A piece 2 inches long and 0.5 inches wide was pressed onto dry enamel paint that was previously brushed on the banner substrate and then pulled off the banner substrate from an edge of the tape. Results were determined by comparing the amount of paint that was adhered to the tape after removal.

EXAMPLE 1

A paint receptive banner fabric consisting of a polyester base fabric (18×9 thread count with a weft insertion WARP knit construction) sandwiched between two films of plasticized polyvinyl chloride (4.5 mils thick) one of which was coated with a vinyl acrylic copolymer obtained from CIE-27 marketed by Custom Chemicals Corporation was laminated together on a lamination machine. A lettering enamel, #L162 Purple manufactured by Chromatic Paint Corporation, was brushed on the surface of the banner fabric coated with the vinyl acrylic copolymer. The lettering enamel exhibited no tack when touched after 3.5 hours. The lettering enamel exhibited no peeling when Scotch ® tape and masking tape pull tests were performed.

COMPARATIVE EXAMPLE 1

A banner fabric consisting of a polyester base fabric sandwiched between two polymeric plasticized polyvinyl chloride layers was laminated together on a lamination machine. A lettering enamel was brushed on one surface of one of the polymeric plasticized polyvinyl chloride layers. The lettering enamel exhibited tack when touched for up to 8–9 hours. The lettering enamel exhibited peeling when Scotch ® tape and masking tape pull tests were performed.

COMPARATIVE EXAMPLE 2

A banner fabric consisting of a polyester base fabric sandwiched between two plasticized polyvinyl chloride layers was laminated together on a laminating machine. A lettering enamel was brushed on one surface of one of the plasticized polyvinyl chloride layers. The lettering enamel exhibited tack when touched for 8 to 9 hours. The lettering enamel exhibited peeling when Scotch ® tape and masking tape pull tests were performed.

COMPARATIVE EXAMPLE 3

A banner fabric consisting of a polyester base fabric sandwiched between two films of plasticized polyvinyl chloride one of which was coated with an acrylic polymer obtained from an acrylic latex was laminated together on a lamination machine. A lettering enamel was brushed on the acrylic polymer film surface of the banner fabric. The lettering enamel exhibited tack when touched for 4 to 5.5 hours. The lettering enamel exhibited peeling when Scotch ®tape and masking tape pull tests were performed.

COMPARATIVE EXAMPLE 4

A banner fabric consisting of a polyester base fabric sandwiched between two films of plasticized polyvinyl chloride one of which was coated with a vinyl acrylic copolymer obtained from a solvent based vinyl acrylic solution was laminated together on a lamination machine. A lettering enamel was brushed on the vinyl acrylic copolymer film surface of the banner substrate. The lettering enamel exhibited tack when touched for 7 hours. The lettering enamel exhibited peeling when Scotch ® tape and masking tape pull tests were performed.

COMPARATIVE EXAMPLE 5

A banner fabric consisting of a polyester base fabric sandwiched between two films of plasticized polyvinyl chloride one of which was coated with a solvent based polyurethane coating was laminated together on a lamination machine. A lettering enamel was brushed on the polyurethane film surface of the banner substrate. The lettering enamel exhibited tack when touched for 5 to 6 hours. The lettering enamel exhibited peeling when Scotch ® tape and masking tape pull tests were performed.

CONCLUSION

While this invention has been disclosed in this patent application by reference to the details of preferred embodiments of the invention, it is to be understood that this disclosure is intended in an illustrative rather than in a limiting sense, as it is contemplated that modifications will readily occur to those skilled in the art, within the spirit of the invention and the scope of the appended claims.

What is claimed is:

1. A flexible substrate that is receptive to enamel paint comprising:
  (a) a base fabric;
  (b) a first coating disposed over at least one surface of said base fabric; and
  (c) an outer coating disposed over the outer surface of said first coating;
  wherein said first coating comprises a plasticized polyvinyl chloride film,
  wherein said outer coating comprises a copolymer that is the reaction product of vinyl and acrylic monomers, and that is applied to said first coating as a water-based dispersion comprising said poly (vinyl-acrylic) copolymer reaction product, and
  wherein aid outer coating provides superior enamel paint receptiveness over the polyvinyl chloride film of the first coating.

2. An enamel paint receptive flexible substrate as in claim 1 wherein said base fabric is coated on both surfaces with said plasticized polyvinyl chloride coating and said vinyl acrylic copolymer coating is disposed over the outer surface of both of said plasticized polyvinyl chloride films.

3. An enamel paint receptive flexible substrate as in claim 1 wherein said second coating is a thermosetting vinyl-acrylic copolymer and said water-based dispersion, from which said copolymer was applied, comprises said copolymer, colloidal silica, isopropyl alcohol, and water.

4. An enamel paint receptive flexible substrate as in claim 3 wherein said base fabric is a synthetic plastic material.

5. An enamel paint receptive flexible substrate as in claim 3 wherein said outer coating has a thickness between 0.1 mil and 1 mil.

6. An enamel paint receptive flexible substrate as in claim 1 wherein said first coating has a thickness between 1 mil and 30 mils.

7. An enamel receptive flexible substrate comprising:
  (a) a base fabric;
  (b) a first coating disposed over at least one surface of said base fabric; and
  (c) an outer coating disposed over the outer surface of said first coating;
  wherein said first coating comprises a plasticized polyvinyl chloride film,
  wherein said base fabric is coated on both surfaces with said plasticized polyvinyl chloride film;
  wherein said outer coating comprises a copolymer that is the reaction product of vinyl and acrylic monomers, and that is a thermosetting vinyl-acrylic copolymer applied to said first coating from a water-based dispersion comprising said poly (vinyl-acrylic) copolymers.

8. An enamel receptive flexible substrate as in claim 7 wherein said outer coating of a vinyl acrylic copolymer is applied from a water-based dispersion comprising poly (vinyl-acrylic) copolymers, colloidal silica, isopropyl alcohol and water by drying said water-based dispersion and curing said poly (vinyl-acrylic) copolymers.

9. An enamel paint receptive flexible substrate comprising:
  (a) a base fabric;

(b) consecutive coatings of plasticized polyvinyl chloride film superimposed on each other and disposed over a surface of said base fabric; and
(c) an outer coating disposed over the outer surface of the outer film of said plasticized polyvinyl chloride film;
wherein said outer coating comprises a copolymer that is the reaction product of vinyl and acrylic monomers, and that is applied to said first coating as a water-based dispersion comprising said poly (vinyl-acrylic) copolymer reaction product, and wherein said outer coating provides superior enamel paint receptiveness over the polyvinyl chloride film of the first coating.

* * * * *